Oct. 22, 1957  H. D. JACOBY  2,810,591
IRRIGATION-TYPE PIPE COUPLING WITH PIVOTED LATCH INTERLOCK
Filed April 26, 1954
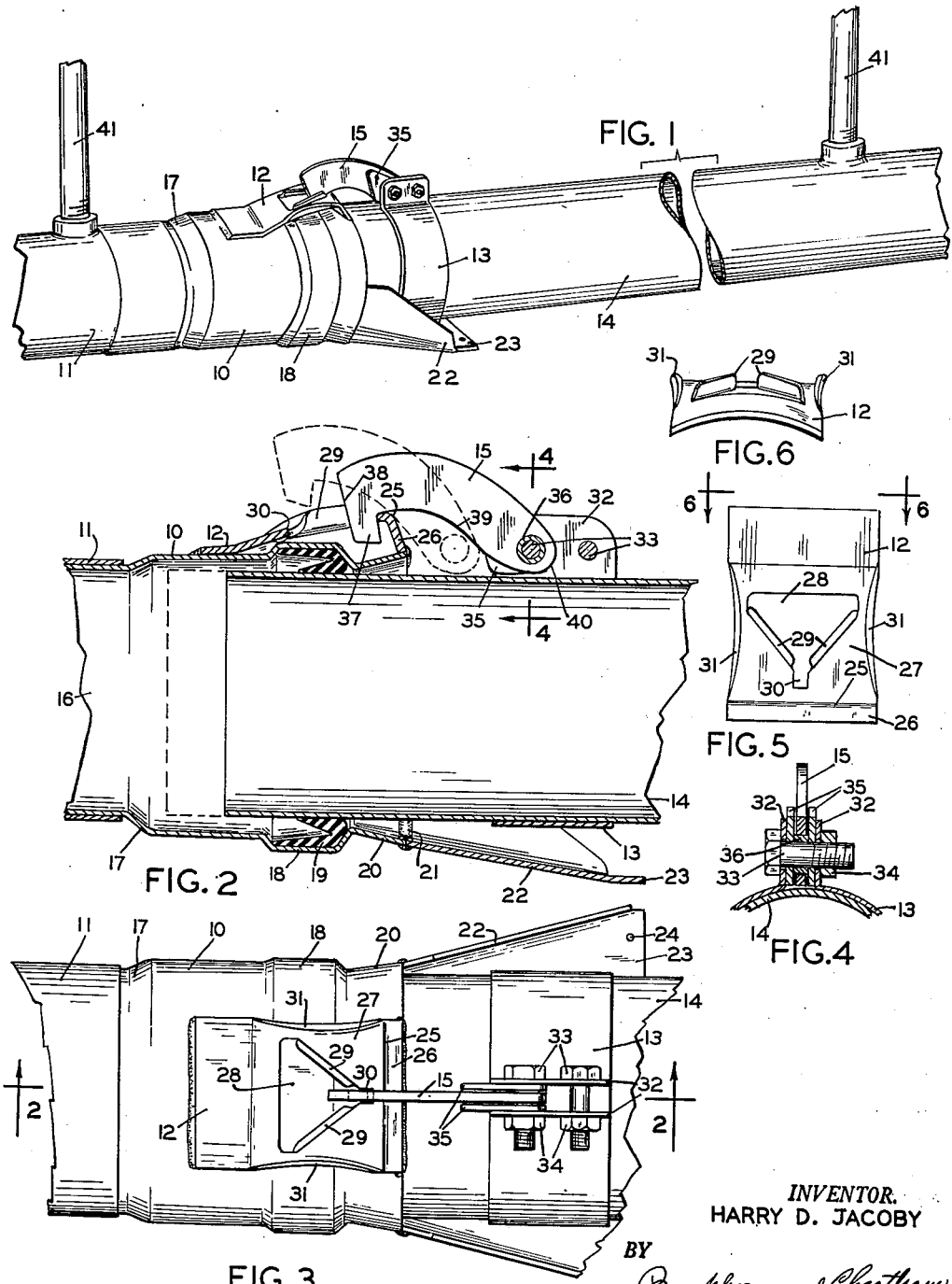

United States Patent Office 2,810,591
Patented Oct. 22, 1957

2,810,591

IRRIGATION-TYPE PIPE COUPLING WITH PIVOTED LATCH INTERLOCK

Harry D. Jacoby, Eugene, Oreg., assignor to Irrigation Equipment Co., Inc., Eugene, Oreg., a corporation of Oregon Application April 26, 1954, Serial No. 425,659

1 Claim. (Cl. 285—6)

My present invention comprises a quick coupler for a pair of pipes, the invention being of particular utility in portable field sprinkling systems. Such systems comprise a series of lengths of pipe made of aluminum or thin steel and of such weight that one man can carry a length of pipe, or possibly two lengths of pipe coupled or joined together. The length of each pipe or pipe section may vary from twenty to forty feet, and each section is usually provided with at least one outlet nipple to which is connected a riser carrying a sprinkler head. The present invention is designed for use with a portable pipe system which is laid on the ground, as distinguished from one which is mounted upon wheels for transverse or longitudinal movement. The length of an individual pipe system may vary from several sections of pipe to many sections, there being instances of a portable pipe line being a half a mile or more in length. Accordingly, the length of time required to move the system from one place of use to an adjoining strip of land so that a large field may be irrigated is a major factor to consider, and the cost of labor involved requires that the uncoupling and coupling of the movable pipe sections should be accomplished instantaneously. The present invention permits the instantaneous coupling or uncoupling of pipe sections with a minimum of effort.

A further object of the present invention is to provide a coupler of the foregoing character which will maintain the pipe sections in definite alignment with each other. The reason for this latter requirement is that the risers supporting the sprinkler heads must be maintained vertical in order that the maximum ground coverage may be achieved. The riser on each section of pipe is situated in longitudinal alignment with a latch mounted at one end of the pipe and a catch mounted at the other end of the pipe. However, all such devices heretofore known to me permit a certain amount of lateral play between the latch and the catch, with the result that the risers at one end of a long line may be upright but those at the other end of the line may be leaning away from the vertical. This effect may not be noticed until the list becomes quite noticeable, requiring the workman to go back along the line and tilt the risers into vertical positions. Furthermore, the force of a side wind against the sprinkler heads and the water issuing therefrom may cause one end of a pipe line to become tilted even though it had been properly positioned in the first instance. A further object of the present invention, therefore, is to provide quick coupling means of the foregoing character which will maintain the risers in exact alignment under any condition, and which automatically position the risers vertically with respect to the ground.

The foregoing and other objects and advantages of the present invention will be more readily apparent from inspection of the accompanying drawings, taken in connection with the following specification, wherein like numerals refer to like parts throughout.

In the drawings,

Fig. 1 is an isometric view of a coupler of the present invention joining two sections of pipe having risers thereon;

Fig. 2 is a vertical section, on an enlarged scale, taken substantially along line 2—2 of Fig. 3;

Fig. 3 is a plan view of the coupler in assembled condition with portions of the connected pipes;

Fig. 4 is a vertical section taken substantially along line 4—4 of Fig. 2;

Fig. 5 is a plan view of the catch forming a portion of the present invention; and Fig. 6 is an end view of Fig. 5 looking from the direction of the arrows 6—6.

The present invention comprises a pair of coupling members including an end bell 10 adapted to be mounted on one end of a section of pipe 11 and comprising a catch 12, and a split ring clamp 13 adapted to be affixed to an end of a second pipe 14 and pivotally supporting a catch 15. The end bell is suitably affixed to the end of the pipe 11, in the present instance comprising a press-fit neck portion 16 adapted to be forced into and expand the end of the pipe section 11 whereby to form a watertight joint therewith. The neck 16 is joined to the body of the end bell 10 through an outwardly tapering shoulder 17 whereby the internal diameter of the end bell is considerably larger than the external diameter of the end of the pipe 14, which is of the same diameter as the pipe 11. The end bell is provided with an outwardly extending annular ridge 18 defining an internal groove in which is seated a gasket 19 adapted to sealingly engage the inserted end of pipe 14 whereby a watertight union is effected. The gasket herein illustrated is the conventional type of chevron gasket having a resilient flange which is directed inwardly from the mouth of the end bell so that the pipe end may be slid into the end bell without disrupting the gasket, and whereby water pressure exerted in the groove of the gasket forces the gasket into tight sealing engagement. The end bell terminates in an outwardly flaring portion 20 having a rim 21 at right angles to the longitudinal axis of the pipe. A flaring scoop-foot 22 is welded to the lower half of the rim 21, and terminates in a flat horizontal flange 23 provided with openings 24 whereby the foot may be nailed to a supporting board if desired, such a board being preferred to prevent the pipe line from being tipped over by high winds or tall risers. The scoop 22 also provides a guide to direct the end of the pipe 14 into the end bell, thus facilitating coupling by one man carrying a section of pipe near the middle of its length.

The catch 12 comprises a substantially rectangular sheet metal member having a transverse ridge 25 near its forward end, the ridge being at the junction of a forward, abruptly sloping portion 26 inclined rearwardly and upwardly from the rim 21 and a rearward, gently sloping longer portion 27 inclined downwardly away from the rim 21. The lower, forward edge of the portion 26 is welded to the rim 21 at the top of the end bell and the extreme end of the portion 27 is welded to the exterior surface of the end bell between the shoulder 17 and the portion 18 thereof. The sloping portion 27 is provided with a triangular opening 28, preferably in the form of an equilateral triangle having its base extending transversely, its apex centrally located adjacent the ridge 25, and its sides diverging rearwardly from the rim of the end bell. The sides of the opening are preferably provided with upwardly directed flanges 29 which terminate short of the apex of the triangle, and the opening is provided with a small, rectangular, parallel-sided extension 30 terminating just short of the ridge 25. Each side edge of the catch is bent upwardly to define an outwardly extending flange 31 extending from adjacent the ridge 25 to a point beyond the base of the opening 28.

It is to be appreciated that the foregoing description applies specifically to a sheet metal construction. However, the same physical elements may be formed in a cast aluminum end bell having the catch cast integrally therewith, or the catch may be forged of malleable iron and suitably affixed to an end bell of any suitable material.

The mounting clamp 13 comprises a strip of sheet metal formed into a split ring capable of encircling the end of the pipe 14 and terminating in a pair of outwardly directed ears 32, the band being clamped in firm engagement with the end of the pipe by suitable means such as one or more bolts 33 passing through the ears and nuts 34 engaged therewith. The clamping ring 13 is mounted on the end of the pipe in spaced relation to the open end thereof with the bolts extending transversely, horizontally across the top of the pipe and in spaced relation thereto. A pair of guide flanges 35 are mounted on the forward bolt 33 in face-to-face engagement with the inner surfaces of the ears 32, the adjacent surfaces of the guide flanges being pressed into engagement with the opposite ends of a short bushing 36 surrounding the stem of the bolt 33. When the forward bolt is drawn up tight the guide flanges 35, which extend toward the end of the pipe and upwardly from the ears on the clamping ring, are maintained in exactly spaced parallel relationship. The rear bolt 33 may be drawn up to any extent necesary firmly to clamp the clamp 13 around the pipe when two bolts are used.

The bushing 36 constitutes a pivot bushing extending transversely about the forward or pivot bolt 33, and supports the hook member 15. The hook member is free to swing in a radial plane extending longitudinally of the pipe, being maintained in longitudinal alignment by the guide flanges 35. The hook member is in the form of a thick sheet metal member of slightly less thickness than the spacing between the inner surfaces of the guide flanges 35 so that no pressure is exerted thereagainst. The hook member terminates in a downwardly directed hook 37 which rests against the surface of the pipe 14 when the pipes are separated, the hook having a forward edge 38 which forms an acute angle with the surface of the pipe, the angle opening toward the end of the pipe. The lower edge 39 of the hook member between the pivot bushing 36 and the hook 37 is downwardly inclined in the same direction. Beyond the pivot bushing 36 the hook member is provided with a curved, longitudinally extending toe 40 which permits upward swinging of the hook member, but which engages the surface of the pipe prior to the hook member achieving a vertical position whereby it is prevented from flopping over into an inoperative position and will always be maintained in an overhanging, forwardly extending relation.

The operation of the device is as follows. A workman holding a length of pipe on which the hook member is clamped directs the end of the pipe into the end bell of a length of pipe lying on the ground, with the hook aimed toward the sloping portion 26 of the catch. Insertion of the pipe to a position beyond that fully illustrated toward the position illustrated in dash outline in Fig. 2 results in the forward edge 38 of the latch and the portion 26 of the catch cooperating to raise the tip of the hook 37 over the ridge 25 whereupon the hook may drop into the opening 28. If the hook should happen to be toward one longitudinal edge of the catch, the flange 31 will guide the hook toward the corner of the opening adjacent the base of the opening. The inclined lower edge 39 of the intermediate portion of the hook engages the ridge 25 to raise the hook to the position shown in dash outline in Fig. 2 and the flange 31 will have rotated the pipe toward the desired position so that upon retraction of the pipe the flange 29 will guide the hook into the opening extension 30. The workman then pulls the pipe outwardly and the hook is guided into the opening extension 30 so that the risers 41 on the two sections of pipe are placed in parallel alignment vertically with respect to the ground. When it is desired to separate the pipes the workman lifts the pipe section 14 and shoves it inwardly to the position illustrated in dash outline in Fig. 2, or until the end of the pipe engages the shoulder 17, whereupon the pipe 14 may be rotated until the hook is beyond either longitudinal side edge of the catch 12. The pipe 14 may then be withdrawn and carried to its new position of use.

Having illustrated and described a preferred embodiment of the present invention, it should be apparent to those skilled in the art that the same permits of modification in arrangement and detail. I claim as my invention all such modifications as come within the true spirit and scope of the appended claim.

I claim:

A quick coupler for a pair of pipes comprising an end bell on the end of one pipe adapted to receive the unobstructed end of the other pipe, a catch mounted on and projecting from the exterior of said end bell and comprising a longitudinally extending strip of sheet metal defining a transverse ridge, said ridge being defined by two oppositely sloping portions comprising an abruptly inclined forward portion rising above the rim of said end bell and a gently inclined rear portion, said rear portion having a triangular opening therethrough with the apex of said opening being centrally disposed adjacent said ridge and with its sides diverging away from said ridge, said opening including a longitudinally extending, parallel-sided extension at its apex, the rearwardly diverging sides of said triangular opening having outwardly extending guide flanges thereon for guiding said hook into the apex of the opening, the lateral edges of said strip of sheet metal having outwardly extending flanges thereon extending longitudinally from said ridge past the base corners of said triangular opening, a pivot extending transversely of said other pipe in longitudinally spaced relation to its unobstructed end, means mounting said pivot on said other pipe in spaced relation to the exterior surface thereof, a latch pivotally mounted on said pivot for swinging movement in a radial plane, said latch extending longitudinally toward, and terminating short of, the unobstructed end of said other pipe and comprising a downwardly extending terminal hook having an inclined forward edge defining an acute angle with the surface of said other pipe, said acute angle opening toward the end of the pipe, an intermediate portion having its lower edge inclined in the same direction as said forward edge, and a limiting toe extending beyond said pivot away from said hook, said limiting toe permitting swinging movement of said hook away from said other pipe but engaging the surface of said other pipe to limit the extent of swinging movement of said hook to an acute angle, said forward edge of said hook and said forward portion of the catch cooperating during partial insertion of said other pipe to lift said hook over said ridge whereby said hook may drop into said opening to latch the pipes together, said flanges on the lateral edges of said catch serving to direct said hook toward the base of said triangle upon longitudinal inserting movement of said other pipe into said end bell, and said flanges on the sides of said triangular opening serving to direct said hook into said extension of the opening upon relative separation of said pipes thereafter, said extension closely confining said hook to maintain said pipes against relative rotation.

References Cited in the file of this patent

UNITED STATES PATENTS

| | | |
|---|---|---|
| 2,464,466 | Stout | Mar. 15, 1949 |
| 2,499,476 | Eyerly | Mar. 7, 1950 |
| 2,505,631 | Webster | Apr. 25, 1950 |
| 2,572,419 | Wyss | Oct. 23, 1951 |
| 2,621,061 | Beymer | Dec. 9, 1952 |
| 2,677,558 | Cornelius | May 4, 1954 |